United States Patent [19]
Kondo et al.

[11] Patent Number: 4,786,066
[45] Date of Patent: Nov. 22, 1988

[54] REAR WHEELS STEERING APPARATUS FOR VEHICLES

[75] Inventors: Toshiro Kondo, Hiroshima; Tadanobu Yamamoto, Higashihiroshima, both of Japan

[73] Assignee: Mazda Motor Corporation, Hiroshima, Japan

[21] Appl. No.: 151,317

[22] Filed: Feb. 1, 1988

[30] Foreign Application Priority Data

| Feb. 5, 1987 | [JP] | Japan | 62-25468 |
| Feb. 5, 1987 | [JP] | Japan | 62-25469 |
| Feb. 5, 1987 | [JP] | Japan | 62-25470 |
| Feb. 5, 1987 | [JP] | Japan | 62-25471 |

[51] Int. Cl.⁴ .......................... B62D 7/14; B62D 5/06
[52] U.S. Cl. ....................................... 280/91; 180/140; 180/152
[58] Field of Search ............... 280/91, 99; 180/140, 180/141, 142, 143, 79.1, 152, 153

[56] References Cited

U.S. PATENT DOCUMENTS 4,315,555 2/1982 Schritt .......................... 180/140
4,335,800 6/1982 Arato .......................... 280/91 X

FOREIGN PATENT DOCUMENTS 0223256 5/1987 European Pat. Off. ............ 180/140
53-40929 4/1978 Japan .......................... 180/140
60-259572 12/1985 Japan .......................... 280/91
61-200064 9/1986 Japan .

Primary Examiner—John J. Love
Assistant Examiner—Charles R. Watts
Attorney, Agent, or Firm—Fleit, Jacobson, Cohn & Price

[57] ABSTRACT

A rear wheels steering apparatus for vehicles including a left rear wheel steering device capable of shifting a left rear wheel in a toe-in direction, a right rear wheel steering device capable of shifting a right wheel in a toe-in direction, a steering operation detecting device for detecting a steering stage of the front wheels of the vehicle and a toe control device for actuating one of the left and right rear wheel steering devices to shift one of the left and right rear wheels in a toe-in direction at an initial steering stage of the front wheels in accordance with a detected signal of the steering operation detecting device and actuating at least the other of the left and right rear wheel steering devices to shift the other of the left and right rear wheels in a toe-in direction at a later steering stage of the front wheels in accordance with a detected signal of the steering operation detecting device. The apparatus permits to make it possible to meet requirements for different steering characteristics required at each steering stage of the front wheels for various kinds of vehicles.

21 Claims, 9 Drawing Sheets

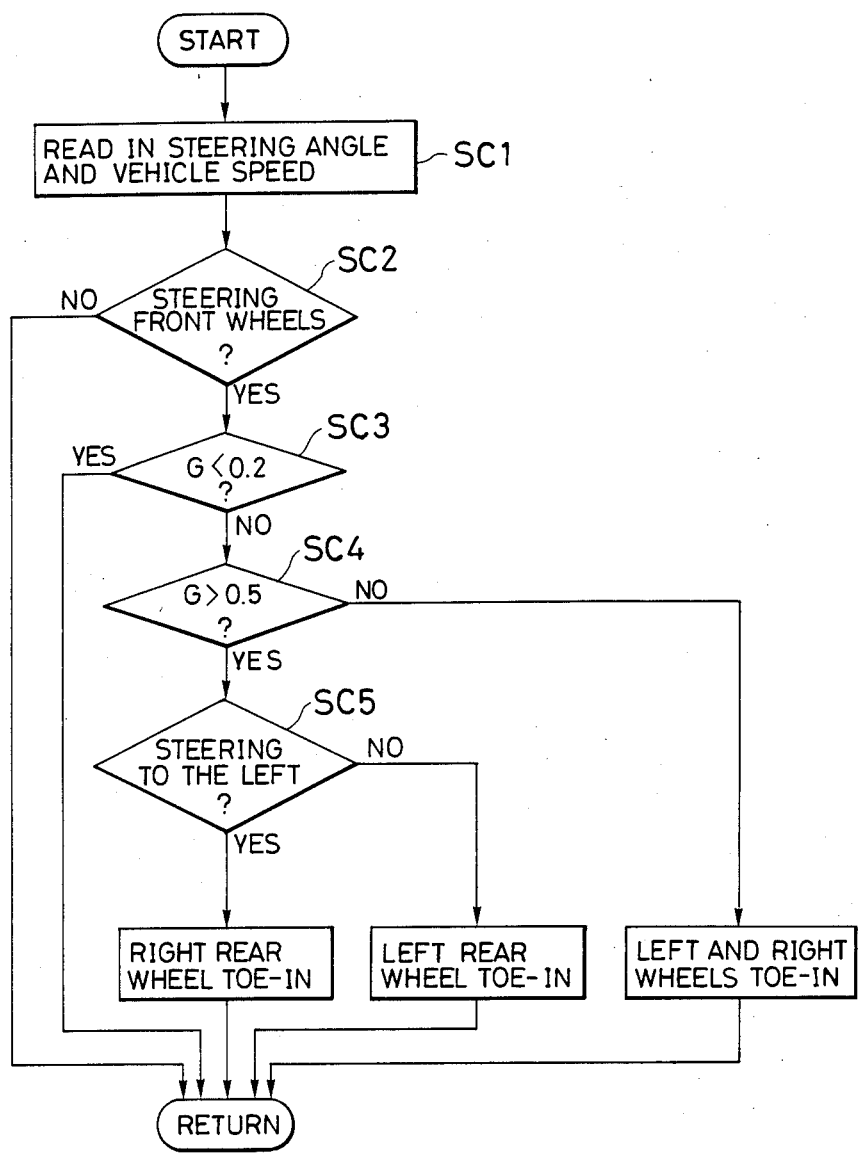

REAR WHEELS STEERING APPARATUS FOR VEHICLES

BACKGROUND OF THE INVENTION

The present invention relates to a rear wheels steering apparatus for vehicles and, particularly, to such an apparatus for producing toe-in movement in rear wheels.

DESCRIPTION OF THE PRIOR ART

Unexamined Japanese Patent Publication No. 61(1986)-200064 discloses a rear wheels steering apparatus for vehicles comprising a toe angle control means for independently controlling the toe angles of respective rear wheels comprised of a hydraulic cylinder device and a control means for controlling the operation of the toe angle control means. In this prior art apparatus, when steering the front wheels, only an outer rear wheel with respect to the turning direction of the vehicle is shifted in the toe-in direction, or each of rear wheels is controlled in the toe-in direction, to thereby obtain an improved steering stability against a side force under high speed vehicle operation.

However, in the prior art apparatus, as the outer rear wheel or the respective rear wheels are controlled in the toe-in direction throughout the steering of the front wheels, so it is possible to improve the steering stability against side forces during steering of the front wheels, such control does not permit turns of a relatively small radius (hereinafter referred to as "turning characteristics"). Further, for different vehicles, different steering characteristics are required between an initial steering stage and a later steering stage. For example, for vehicles having the steering characteristics with a high under-steer rendered at a later steering stage, such as front engine-front drive vehicles, it is required to improve the steering stability at the initial steering stage when the steering stability tends to be degraded and to increase the turning characteristics at the later steering stage by preventing the high-under steer steering characteristics.

SUMMARY OF THE INVENTION

It is therefore an object of the present invention to provide a rear wheels steering apparatus for vehicles capable of improving turning characteristics of vehicles.

Another object of the present invention is to provide a rear wheels steering apparatus for vehicles capable of meeting requirements for different steering characteristics required at each steering stage of front wheels for various kinds of vehicles.

According to the present invention, the above and other objects can be accomplished by a rear wheels steering apparatus for vehicles comprising left rear wheels steering means capable of shifting a left rear wheel in a toe-in direction, right rear wheels steering means capable of shifting a right wheel in a toe-in direction, steering operation detecting means for detecting the steering stage of the front wheels of said vehicle and toe control means for actuating one of said left and right rear wheel steering means to shift one of said left and right rear wheels in a toe-in direction at an initial steering stage in accordance with a detected signal of said steering operation detecting means and actuating at least the other of said left and right rear wheels steering means to shift the other of said left and right rear wheels in a toe-in direction at a later steering stage.

In a preferred aspect of the present invention, the toe control means actuate one of the left and right rear wheels steering means to shift an inner rear wheel with respect to the turning direction of the vehicle in a toe-in direction at an initial steering stage in accordance with a detected signal of the steering operation detecting means and actuate the other of the left and right rear wheel steering means to shift an outer rear wheel in a toe-in direction at a later steering stage.

In another preferred aspect of the present invention, the toe control means actuate one of the left and right rear wheel steering means to shift an outer rear wheel with respect to the turning direction of the vehicle in a toe-in direction at an initial steering stage in accordance with a detected signal of the steering operation detecting means and actuate the other of the left and right rear wheel steering means to shift an inner rear wheel in a toe-in direction at a later steering stage.

In a further preferred aspect of the present invention, the toe control means actuate one of the left and right rear wheel steering means to shift an outer rear wheel with respect to the turning direction of the vehicle in a toe-in direction at an initial steering stage in accordance with a detected signal of the steering operation detecting means and actuate the respective left and right rear wheel steering means to shift respective rear wheels in a toe-in direction at a later steering stage.

In a further preferred aspect of the present invention, the toe control means actuate one of the left and right rear wheel steering means to shift an inner rear wheel with respect to the turning direction of the vehicle in a toe-in direction at an initial steering in accordance with a detected signal of the steering operation detecting means and actuating the respective left and right rear wheel steering means to shift respective rear wheels in a toe-in direction at a later steering stage.

The above and other objects and features of the present invention will be apparent from the following description made with reference to the accompanying drawings.

BRIEF DESCRIPTION OF THE DRAWINGS

FIG. 8 is a flow chart showing the toe control of the rear wheels in a further embodiment of the present invention.

DESCRIPTION OF THE PREFERRED EMBODIMENTS

Figure 1:
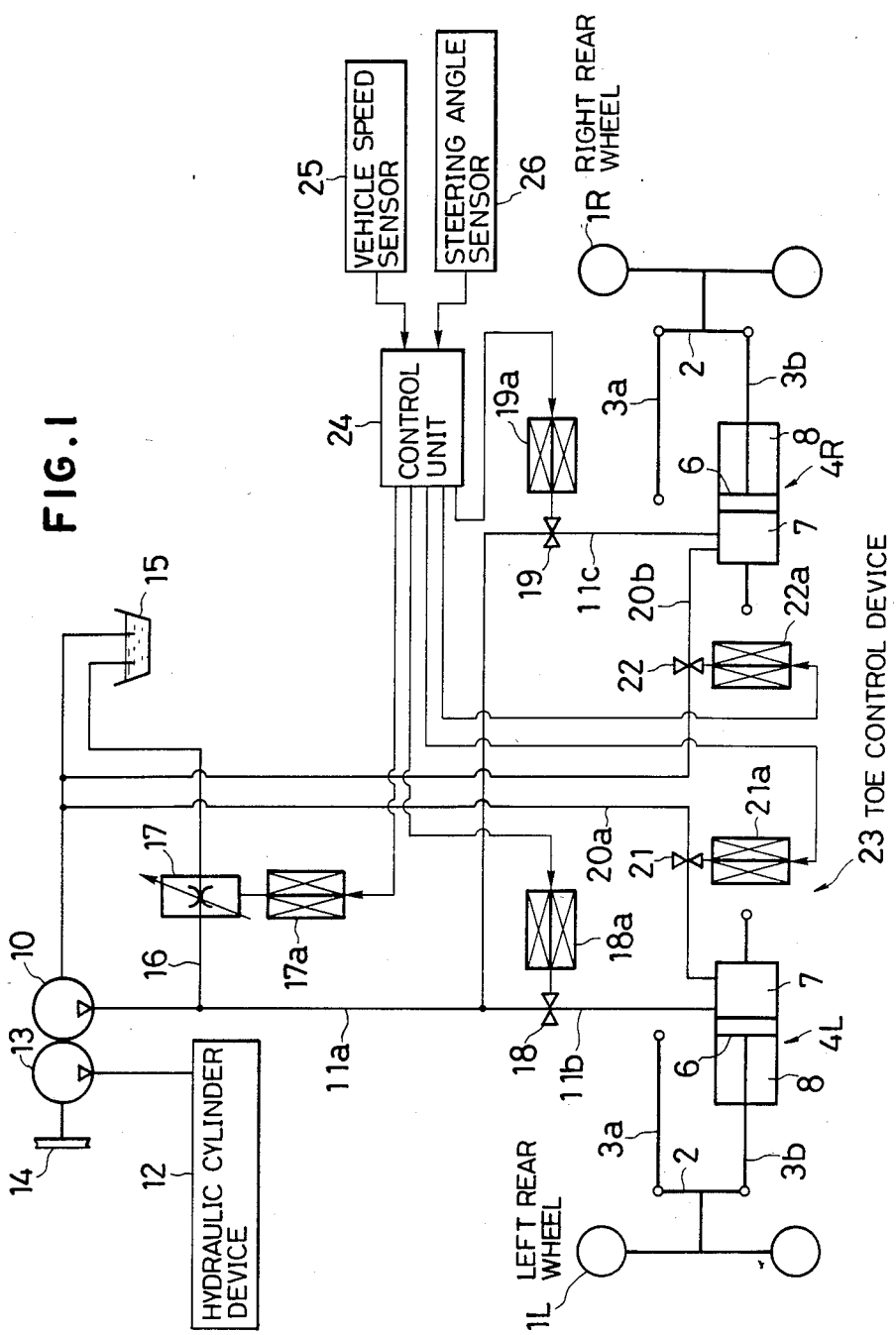
FIG. 1 is a schematic drawing showing a rear wheels steering apparatus for vehicles which is an embodiment of the present invention.

Referring to FIG. 1, there is shown a rear wheels steering apparatus which is an embodiment of the present invention. In FIG. 1, a left rear wheel 1L and a right rear wheel 1R are each supported by a vehicle body (not shown) via supporting members 2 and a pair of front and rear lateral links 3a, 3b. Left and right hydraulic cylinder devices 4L and 4R are provided between the rear lateral links 3b and the vehicle body.

Figure 2:
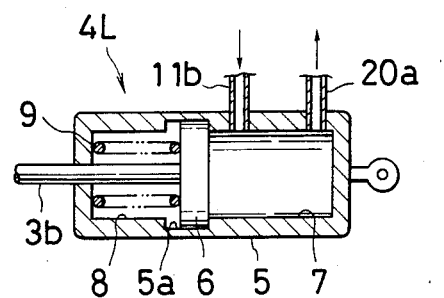
FIG. 2 is a schematic drawing showing a hydraulic cylinder device used in an embodiment of the present invention.

As can be seen the detailed structure shown in FIG. 2, each hydraulic cylinder device 4L, 4R has a cylinder body 5 having a piston receiving portion 5a, a piston 6 slidable within the piston receiving portion 5a of the cylinder body 5, and a hydraulic pressure chamber 7 and a spring chamber 8 which are separated by the piston 6. The cyinder body 5 is connected to the vehicle body and the piston 6 is connected to the end of the rear lateral link 3b extending through the spring chamber 8. In the spring chamber 8, there are provided springs 9 for urging the piston 6 toward the hydraulic pressure chamber 7. When no pressurized oil is introduced into the hydraulic pressure chamber 7 and the piston 6 is urged toward the side of the oil pressure chamber 7 by the springs 9, the toe directions of the rear wheels 1L and 1R are neutral; in other words, no toe movement is produced in the rear wheels 1L and 1R, and as the amount of oil fed into the hydraulic pressure chamber 7 increases and the piston 6 is moved toward the side of the spring chamber 8, the rear wheels 1L and 1R are shifted in the toe-in direction, in other words, toe-in movements are produced in the rear wheels.

Further, the hydraulic pressure chambers 7 of the hydraulic cylinder devices 4L, 4R are communicated through oil passages 11a and 11b or 11c with an oil pump 10 for steering the rear wheels which is driven by engine output transmitted by a pulley 14. An oil pump 13 for front wheels is also driven by the engine output transmitted by the pulley 14. The oil passage 11a is branched to an oil passage 16 communicating with a reserve tank 15 upstream of the oil passage 11b and 11c. Provided within the oil passage 16 is an orifice 17 for controlling the pressure of oil fed into the hydraulic cylinder devices 4L and 4R. Valves 18 and 19 are provided in the oil passages 11b and 11c respectively. The orifice 17 is fully opened when the actuating portion 17a thereof is not energized by an electrical current and the valves 18 and 19 are closed when the respective actuating portions 18a and 19a are not energized by an electrical current.

Moreover, there are provided oil discharge passages 20a and 20b for discharging oil from the hydraulic pressure chambers 7 to the reserve tank 15. Within the respective oil discharge passages 20a and 20b are provided valves 21 and 22 which are fully opened when the actuating portions 21a and 21b thereof are not energized by an electrical current. Thus, a toe control device 23 for controlling the toe direction of the each rear wheel independently is constituted by the hydraulic cylinder devices 4L and 4R and the oil circuit comprising a plurality of oil passages and valves connected thereto.

The toe control device 23 is operated in accordance with ON signals input to the actuating portions 17a, 18a, 19a, 21a, 22a of the orifice 17 and valves 18, 19, 21 and 22 from a control unit 24 which receives signals from a vehicle speed sensor 25 for sensing vehicle speed and a steering angle sensor 26 for sensing steering angle.

Figure 4:
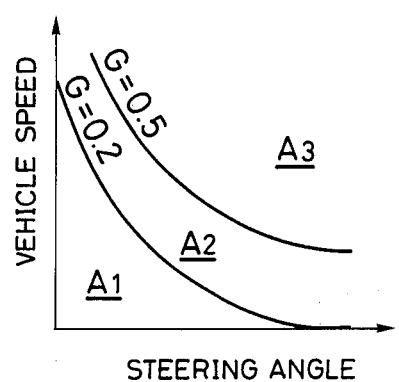
FIG. 4 is a graph showing a control map for controlling rear wheels used in an embodiment of the present invention.
Figure 3:
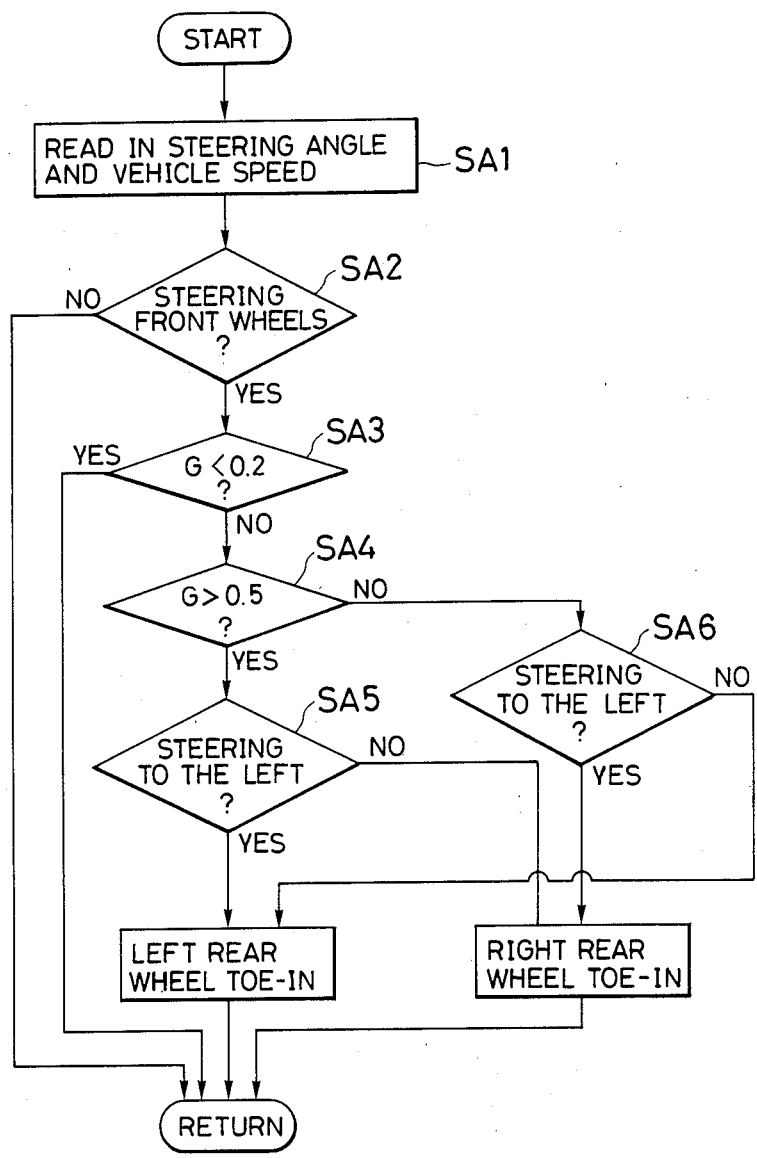
FIG. 3 is a flow chart showing the toe control of the rear wheels in an embodiment of the present invention.

FIG. 3 shows a flow chart for controlling the toe direction of the rear wheels 1L and 1R in an embodiment of the present invention. In this embodiment, the toe direction of the rear wheels is controlled so that only an inner rear wheel with respect to the turning direction of the vehicle is shifted in a toe-in direction at an initial steering stage of the front wheels, and only an outer rear wheel is shifted in a toe-in direction at a later steering stage of the front wheels, thereby to improve the turning characteristics at the initial steering stage and the steering stability of the vehicle at the later steering stage. This embodiment is based upon the recognition that since the side forces acting on the vehicle are small at the initial steering stage, it is preferable to improve the turning characteristics rather than the steering stability of the vehicle at this stage and that, on the other hand, it is preferable to improve the steering stability rather than the turning characteristics at the later steering stage where the side forces acting on the vehicle are larger. For this purpose, the control unit 24 stores a control map experimentally determined in advance for controlling the toe direction of the rear wheels, as shown in FIG. 4. In FIG. 4, there are three control regions A1, A2 and A3 depending upon the non-dimensional lateral acceleration G acting on the vehicle which is defined by a/g where "a" is an acceleration acting laterally on the vehicles and "g" is the acceleration of gravity. In region A1 where the non-dimensional lateral acceleration G is very small, less than 0.2, no toe movement is produced, since toe control for the rear wheels is unnecessary even if the front wheels are being steered. In region A2 where the non-dimensional lateral acceleration G is medium, not less than 0.2 and not more than 0.5, only the inner rear wheel is shifted in a toe-in direction, since this region corresponds to an initial steering stage. Further, in the region A3 where the non-dimensional lateral acceleration G is large, more than 0.5, only the outer rear wheel is shifted in a toe-in direction, since this region corresponds to a later steering stage.

Referring to FIG. 3, first, the control unit 24 reads in a signal sensed by the vehicle speed sensor 25 and a signal sensed by the steering angle sensor 26 (Step SA1) and then it is determined by the control unit 24 whether or not the steering member is being operated based upon the steering angle signal (Step SA2).

Figure 5:
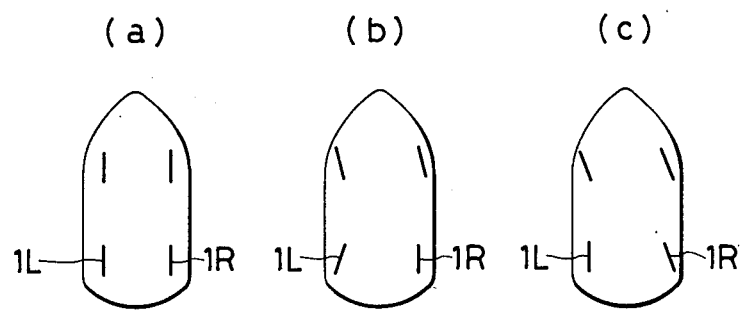
FIG. 5 is a schematic drawing showing the toe control of the rear wheels in an embodiment of the present invention.

If NO, the non-dimensional lateral acceleration is G=0 which means that the vehicle is being operated in a straight line, so the driving operation of the vehicle falls within the region A1 of the map shown in FIG. 4 and the control unit 24 outputs no ON signal to the respective actuating portions 17a, 18a, 19a, 21a and 22a of the orifice 17 and valves 18, 19, 21 and 22. As a result, the orifice is fully opened and the valves 18 and 19 are closed and the valves 21 and 22 are fully opened. Consequently, no oil pressure is fed to the respective hydraulic pressure chambers 7 of the hydraulic cylinder devices 4L and 4R and the respective piston 6 is positioned at the end on the side of the respective hydraulic pressure chamber 7, thereby producing no toe movement in the rear wheels 1L and 1R as shown in FIG. 5(a).

On the other hand, if YES, the front wheels are being steered and it is further determined by the control unit 24 whether or not the non-dimensional lateral acceleration G is less than 0.2, that is, if the driving operation of the vehicle falls within the region A1 of the map shown in FIG. 4 (Step SA3).

If YES, the non-dimensional lateral acceleration G is less than 0.2 and the driving operation of the vehicle falls within the region A1 of the map shown in FIG. 4. So, no toe movement is produced in the rear wheels in a similar manner to the case where the non-dimensional lateral acceleration is G=0 as shown in FIG. 5(a).

On the other hand, if NO, it is further determined by the control unit 24 whether or not the the non-dimensional lateral acceleration G is more than 0.5, that is, whether the driving operation of the vehicle falls within the region A3 (Step SA4).

If NO, the non-dimensional lateral acceleration G is not less than 0.2 and not more than 0.5 and the driving operation of the vehicle falls within the region A2. It is further determined by the control unit 24 whether or not the vehicle is being steered to the left (Step SA5). As a result, if the vehicle is being steered to the left, the control unit 24 produces an ON signal and outputs it to the orifice 17 and the valves 18 and 21, and the opening of the orifice 17 is controlled so as to feed a predetermined oil pressure to the hydraulic pressure chamber 7 of the hydraulic cylinder device 4L, the valve 18 is opened and the valve 21 is closed. Consequently, since oil pressure is fed to the hydraulic pressure chamber 7 of the hydraulic cylinder device 4L, the piston 6 is urged toward the spring chamber 8, thereby to shift only the left rear wheel 1L, which is an inner rear wheel, in a toe-in direction as shown in FIG. 5(b). On the contrary, if the vehicle is being steered to the right, the control unit 24 outputs an ON signal to the orifice 17 and the valves 19 and 22, and the opening of the orifice 17 is controlled so as to feed a predetermined oil pressure to the hydraulic pressure chamber 7 of the hydraulic cylinder device 4R, the valve 19 is opened and the valve 22 is closed. Consequently, since oil pressure is fed to the hydraulic pressure chamber 7 of the hydraulic cylinder device 4R, the piston 6 is urged toward the spring chamber 8, thereby to shift only the right rear wheel 1R, which is an inner rear wheel, in a toe-in direction. Thus, since only the inner rear wheel with respect to the turning direction of the vehicle is shifted in a toe-in direction, the turning characteristics can be improved at an initial steering stage.

If YES, the non-dimensional lateral acceleration G is more than 0.5 and the driving operation of the vehicle falls within the region A3. It is further determined by the control unit 24 whether or not the vehicle is being steered to the left (Step SA6). As a result, if the vehicle is being steered to the left, the control unit 24 produces an ON signal and outputs it to the orifice 17 and the valves 19 and 22, and the opening of the orifice 17 is controlled so as to feed a predetermined oil pressure to the hydraulic pressure chamber 7 of the hydraulic cylinder device 4R, the valve 19 is opened and the valve 22 is closed. Consequently, since oil pressure is fed to the hydraulic pressure chamber 7 of the hydraulic cylinder device 4R, the piston 6 is urged toward the spring chamber 8, thereby the shift only the right rear wheels 1R, which is an outer rear wheel, in a toe-in direction as shown in FIG. 5(c). On the contrary, if the vehicle is being steered to the right, the control unit 24 outputs an ON signal to the orifice 17 and the valves 18 and 21, and the opening of the orifice 17 is controlled so as to feed a predetermined oil pressure to the hydraulic pressure chamber 7 of the hydraulic cylinder device 4L, the valve 18 is opened and the valve 21 are closed. Consequently, since oil pressure is fed to the hydraulic pressure chamber 7 of the hydraulic cylinder device 4L, the piston 6 is urged toward the spring chamber 8, thereby to shift only the left rear wheel 1L, which is an outer rear wheel, in a toe-in direction. Thus, since only the outer rear wheel with respect to the turning direction of the vehicle is shifted in a toe-in direction, the steering stability of the vehicle is improved at a later steering stage where the lateral acceleration is large.

According to the above described embodiment, since only an inner rear wheel is shifted in a toe-in direction at an initial steering stage and only an outer rear wheel is shifted in a toe-in direction at a later steering stage, it is possible to improve the turning characteristics at the initial steering stage and the steering stability of the vehicle at the later stage where the lateral acceleration is large.

Figure 6:
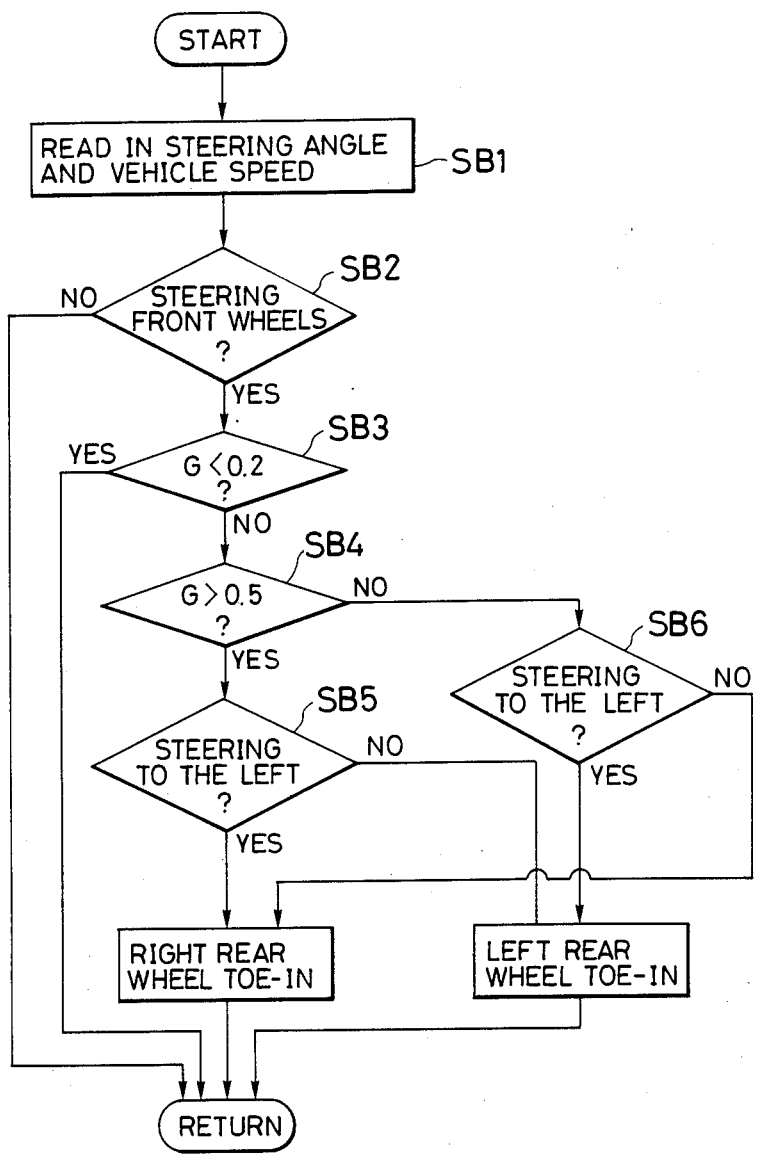
FIG. 6 is a flow chart showing the toe control of the rear wheels in another embodiment of the present invention.

FIG. 6 shows a flow chart for controlling the toe direction of the rear wheels 1L, 1R in another embodiment of the present invention. In this embodiment, the toe direction of the rear wheels is controlled so that only an outer rear wheel with respect to the turning direction of the vehicle is shifted in a toe-in direction at a initial steering stage of the front wheels, and that only an inner rear wheel is shifted in a toe-in direction at a later steering stage of the front wheels, thereby to improve the steering stability of the vehicle at the initial steering stage and to prevent too much under-steer in the steering characteristics, thereby to improve the turning characteristics at the later steering stage. This embodiment is based upon the recognition that since the vehicle movement is often unstable at an initial steering stage, it is preferable to improve the steering stability of the vehicle at this stage rather than the turning characteristics and that since the steering characteristics of the vehicle is often too much under-steer at a later steering stage, thereby degrading the turning characteristics, it is preferable to improve the turning characteristics at this stage rather than the steering stability. For this purpose, the control unit 24 stores a control map as shown in FIG. 4 for controlling the toe direction of the rear wheels. More specifically, in region A1 where the non-dimensional lateral acceleration G is very small, less than 0.2, no toe movement is produced, since toe control for the rear wheels is unnecessary even if the front wheels are being steered. In region A2 where the non-dimensional lateral acceleration G is medium, not less than 0.2 and not more than 0.5, only the outer rear wheel is shifted in a toe-in direction, since this region corresponds to an initial steering stage. Further, in the region A3 where the non-dimensional later acceleration G is large, more than 0.5, only the inner rear wheel is shifted in a toe-in direction, since this region corresponds to a later steering stage.

Referring to FIG. 6, first, the control unit 24 reads in a signal sensed by the vehicle speed sensor 25 and a signal sensed by the steering angle sensor 26 (Step SB1) and then it is determined by the control unit 24 whether or not the steering member is being operated based upon the steering angle signal (Step SB2).

If NO, the non-dimensional lateral acceleration is G=0 which means that the vehicle is being operated in a straight line and that the driving operation of the vehicle falls within the region A1 of the map shown in FIG. 4, and the control unit 24 does not output an ON signal to the actuating portions 17a, 18a, 19a, 21a and 22a of the orifice 17 and valves 18, 19, 21 and 22. As a result, the orifice is fully opened, the valves 18 and 19 are closed and the valves 21 and 22 are fully opened. Consequently, no oil pressure is fed to the respective hydraulic pressure chambers 7 of the hydraulic cylinder devices 4L and 4R and the respective pistons 6 are positioned at the end towad the respective hydraulic pressure chamber 7, thereby to produce no toe movement in the respective rear wheels 1L and 1R, as shown in FIG. 7(a).

On the other hand, if YES, the front wheels are being steered and it is further determined by the control unit 24 whether or not the non-dimensional lateral acceleration G is less than 0.2, that is, whether the driving operation of the vehicles falls within the region A1 of the map shown in FIG. 4 (Step SB3).

Figure 7:
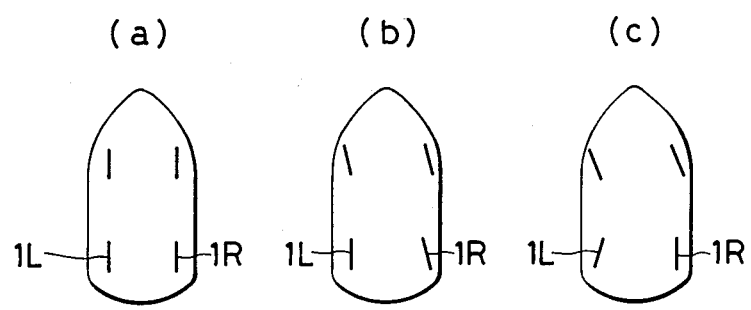
FIG. 7 is a schematic drawing showing the toe control of the rear wheels in another embodiment of the present invention.

If YES, the non-dimensional lateral acceleration G is less than 0.2 and the driving operation of the vehicle falls within the region A1 of the map shown in FIG. 4, so no toe movement is produced in the rear wheels, similarly to the case where the non-dimensional lateral acceleration is G=0 as shown in FIG. 7(a).

On the other hand, if NO, it is further determined by the control unit 24 whether or not the the non-dimensional lateral acceleration G is more than 0.5, that is, whether the driving operation of the vehicle falls within the region A3 (Step SB4).

If NO, the non-dimensional lateral acceleration G is not less than 0.2 and not more than 0.5 and the driving operation of the vehicle falls within the region A2. It is further determined by the control unit 24 whether or not the vehicle is being steered to the left (Step SB5). As a result, if the vehicle is being steered to the left, the control unit 24 produces an ON signal and outputs it to the orifice 17 and the valves 19 and 22, and the opening of the orifice 17 is controlled so as to feed a predetermined oil pressure to the hydraulic pressure chamber 7 of the hydraulic cylinder device 4R and the valve 19 is opened and the valve 22 is closed. Consequently, since oil pressure is fed to the hydraulic pressure chamber 7 of the hydraulic cylinder device 4R, the piston 6 is urged toward the spring chamber 8, thereby to shift only the right rear wheel 1R, which is an outer rear wheel in a toe-in direction as shown In FIG. 7(b). On the contrary, if the vehicle is being steered to the right, the control unit 24 output an ON signal to the orifice 17 and the valves 18 and 21, and the opening of the orifice 17 is controlled so as to feed a predetermined oil pressure to the hydraulic pressure chamber 7 of the hydraulic cylinder device 4L and the valve 18 is opened and the valve 21 is closed. Consequently, since oil pressure is fed to the hydraulic pressure chamber 7 of the hydraulic cylinder device 4L, the piston 6 is urged toward the spring chamber 8, thereby to shift only the left rear wheel 1L which is an outer rear wheel, in a toe-in direction. Thus, since only the outer rear wheel with respect to the turning direction of the vehicle is shifted in a toe-in direction, the steering stability can be improved at an initial steering stage.

If YES, the non-dimensional lateral acceleration G is more than 0.5 and the driving operation of the vehicle falls within the region A3. it is further determined by the control unit 24 whether or not the vehicle is being steered to the left (Step SB6). As a result, if the vehicle is being steered to the left, the control unit 24 produces ON signal and outputs it to the orifice 17 and the valves 18 and 21, and the opening of the orifice 17 is controlled so as to feed a predetermined oil pressure to the hydraulic pressure chamber 7 of the hydraulic cylinder device 4L and the valve 18 is opened and the valve 21 is closed. Consequently, since oil pressure is fed to the hydraulic pressure chamber 7 of the hydraulic cylinder device 4L, the piston 6 is urged toward the spring chamber 8, thereby to shift only the left rear wheel 1L which is an inner rear wheel, in a toe-in direction as shown in FIG. 7(c). On the contrary, if the vehicle is being steered to the right, the control unit 24 outputs an ON signal to the orifice 17 and the valves 19 and 22, and the opening of the orifice 17 is controlled so as to feed a predetermined oil pressure to the hydraulic pressure chamber 7 of the hydraulic cylinder device 4R and the valve 19 is opened and the valve 22 is closed. Consequently, since oil pressure is fed to the hydraulic pressure chamber 7 of the hydraulic cylinder device 4R, the piston 6 is urged toward the spring chamber 8, thereby to shift only the right rear wheel 1R which is an inner rear wheel, in a toe-in direction. Thus, since only the inner rear wheel with respect to the turning direction of the vehicle is shifted in a toe-in direction, the too much under-steer in the steering characteristics of the vehicle is prevented, thereby improving the turning characteristics at a later steering stage.

According to the above described embodiment, since only an outer rear wheel is shifted in a toe-in direction at an initial steering stage and only an inner rear wheel is shifted in a toe-in direction at a later steering stage, it is possible to improve the steering stability of the vehicle at the initial steering stage and the turning characteristics at the later steering stage by preventing the steering characteristics from having too much under-steer.

FIG. 8 shows a flow chart for controlling the toe direction of the rear wheels 1L, 1R in a further embodiment of the present invention. In this embodiment, the toe direction of the rear wheels is controlled so that only an outer rear wheel with respect to the turning direction of the vehicle is shifted in a toe-in direction at an initial steering stage of the front wheels and both rear wheels are shifted in a toe-in direction at a later steering stage of the front wheels, thereby to improve the steering stability of the vehicle at the initial steering stage and to improve the steering response in a reverse direction at the later steering stage. This embodiment is based upon the recognition that since the vehicle movement is often unstable at an initial steering stage, it is preferable to improve the steering stability of the vehicle at this stage, and that since it is often required to steer in one direction and then steer in a reverse direction after a lane change operation, it is preferable to improve the steering response in a reverse direction at a later steering stage rather than the steering stability. For this purpose, in the control unit 24 is stored a control map as shown in FIG. 4 for controlling the toe direction of the rear wheels. More specifically, in region A1 where the non-dimensional lateral acceleration G is very small, less than 0.2, no toe movement is produced, since the toe control for the rear wheel is unnecessary even if the front wheels are being steered. In region A2 where the non-dimensional lateral acceleration G is medium, not less than 0.2 and not more than 0.5, only the outer rear wheel is shifted in a toe-in direction, since this region corresponds to an initial steering stage. Further, in the region A3 where the non-dimensional lateral acceleration G is large, more than 0.5, both of the rear wheels are shifted in a toe-in direction, since this region corresponds to a later steering stage.

Referring to FIG. 8, first, the control unit 24 reads in a signal sensed by the vehicle speed sensor 25 and a signal sensed by the steering angle sensor 26 (Step SC1) and then it is determined by the control unit 24 whether or not the steering member is being operated based upon the steering angle signal (Step SC2).

If NO, the non-dimensional lateral acceleration is G=0 which means that the vehicle is being operated in a straight line and that the driving operation of the vehicle falls within the region A1 of the map shown in FIG. 4, and the control unit 24 outputs no ON signal to the respective actuating portions 17a, 18a, 19a, 21a and 22a of the orifice 17 and valves 18, 19, 21 and 22. As a result, the orifice is fully opened, and the valves 18 and 19 are closed and the valves 21 and 22 are fully opened. Consequently, no oil pressure fed to the respective hydraulic pressure chambers 7 of the hydraulic cylinder devices 4L and 4R and the pistons 6 are positioned at the end toward the hydraulic pressure chambers 7, thereby to produce no toe movement in the rear wheels 1L and 1R as shown in FIG. 9(a).

On the other hand, if YES, the front wheels are being steered and it is further determined by the control unit 24 whether or not the non-dimensional lateral accelertion G is less than 0.2, that is, whether the driving operation of the vehicle falls within the region A1 of the map shown in FIG. 4 (Step SC3).

Figure 9:
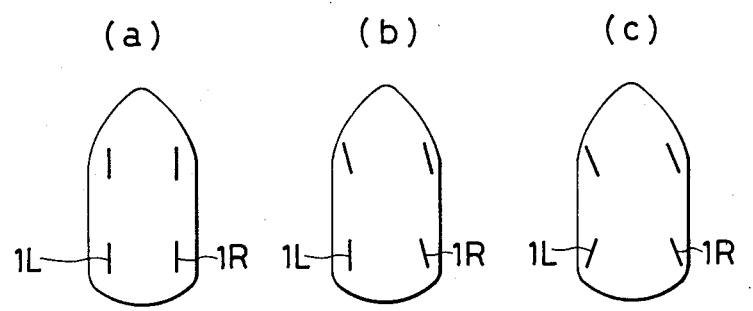
FIG. 9 is a schematic drawing showing the toe control of the rear wheels in a further embodiment of the present invention.

If YES, the non-dimensional lateral acceleration G is less than 0.2 and the driving operation of the vehicle falls within the region A1 of the map shown in FIG. 4, so no toe movement is produced in the rear wheels, similarly to the case where the non-dimensional lateral acceleration is G=0 as shown in FIG. 9(a).

On the other hand, if NO, it is further determined by the control unit 24 whether or not the the non-dimensional lateral acceleration G is more than 0.5, that is, whether the driving operation of the vehicle falls within the region A3 (Step SC4).

If NO, the non-dimensional lateral acceleration G is not less than 0.2 and not more than 0.5 and the driving operation of the vehicle falls within the region A2. It is further determined by the control unit 24 whether or not the vehicle is being steered to the left (Step SC5). As a result, if the vehicle is being steered to the left, the control unit 24 outputs an ON signal to the orifice 17 and the valves 19 and 22, and the opening of the orifice 17 is controlled so as to feed a predetermined oil pressure to the hydraulic pressure chamber 7 of the hydraulic cylinder device 4R, the valve 19 is opened and the valve 22 is closed. Consequently, since oil pressure is fed to the hydraulic pressure chamber 7 of the hydraulic cylinder device 4R, the piston 6 is urged toward the spring chamber 8, thereby to shift only the right rear wheel 1R which is an outer rear wheel, in a toe-in direction as shown in FIG. 9(b). On the contrary, if the vehicle is being steered to the right, the control unit 24 outputs an ON signal to the orifice 17 and the valves 18 and 21, and the opening of the orifice 17 is controlled so as to feed a predetermined oil pressure to the hydraulic pressure chamber 7 of the hydraulic cylinder device 4L and the valve 18 is opened and the valve 21 is closed. Consequently, since oil pressure is fed to the hydraulic pressure chamber 7 of the hydraulic cylinder device 4L, the piston 6 is urged toward the spring chamber 8, thereby to shift only the left rear wheel 1L, which is an outer rear wheel, in a toe-in direction. Thus, since only the outer rear wheel with respect to the turning direction of the vehicle is shifted in a toe-in direction, the steering stability can be improved at an initial steering stage.

If YES, the non-dimensional lateral acceleration G is more than 0.5 and the driving operation of the vehicle falls within the region A3. Then, the control unit 24 produces an ON signal and outputs it to the orifice 17 and the valves 18, 19, 21 and 22, and the opening of the orifice 17 is controlled so as to feed a predetermined oil pressure to the hydraulic pressure chambers 7 of the hydraulic cylinder devices 4L and 4R, and the valves 18 and 19 are opened and the valves 21 and 22 are closed. Consequently, since oil pressure is fed to the hydraulic pressure chamber 7 of the respective hydraulic cylinder devices 4L and 4R, the piston 6 in each hydraulic pressure chamber 7 is urged toward the spring chamber 8, thereby to shift the respective rear wheels 1L and 1R in a toe-in direction. In case where the vehicle is being steered to the left as shown in FIG. 9(c), since the force from the road that acts on the right rear wheel 1R, which is an outer rear wheel, is higher than the force acting on the left rear wheel 1L, which is an inner rear wheel, it is possible to improve the steering stability against the side force acting on the vehicle by shifting the right rear wheel in a toe-in direction even though the left rear wheel in a toe-in direction is being steered. Further, when the front wheels are steered to the right immediately after being steered to the left, for example for a lane change operation, since the left rear wheel (outer rear wheel) 1L has already shifted in a toe-in direction, the steering response of the front wheels can be improved. Thus, since both rear wheels are shifted in a toe-in direction at a later steering stage, the steering response in the reverse direction can be improved at a later steering stage.

According to the above described embodiment, since only an outer rear wheel is shifted in a toe-in direction at an initial steering stage and both rear wheels are shifted in a toe-in direction at a later steering stage, it is possible to improve the steering stability of the vehicle at the initial steering stage and the steering response in the reverse direction at the later steering stage.

Figure 10:
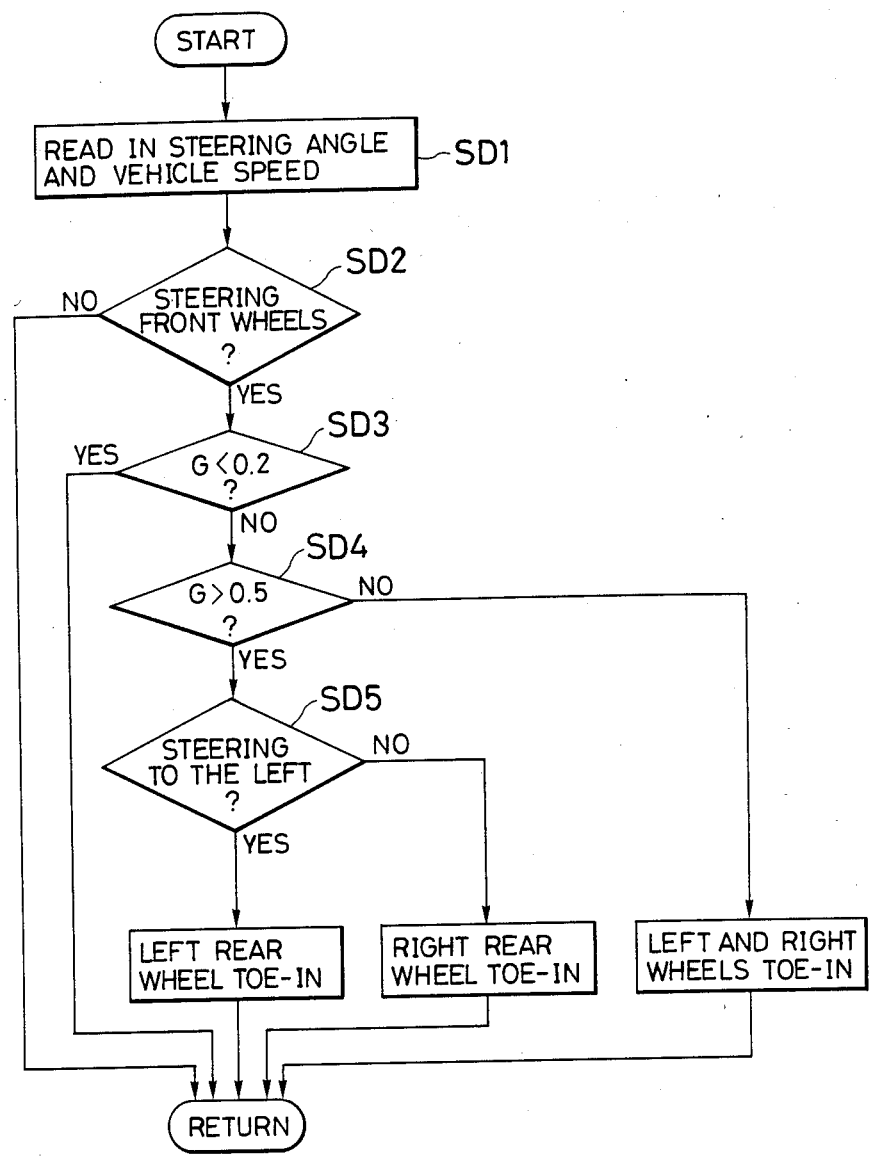
FIG. 10 is a flow chart showing the toe control of the rear wheels in a further embodiment of the present invention.

FIG. 10 shows a flow chart for controlling the toe direction of the rear wheels 1L, 1R in a further embodiment of the present invention. In this embodiment, the toe direction of the rear wheels is controlled so that only an inner rear wheel with respect to the turning direction of the vehicle is shifted in a toe-in direction at an initial steering stage of the front wheels and that both rear wheels are shifted in a toe-in direction at a later steering stage of the front wheels, thereby to improve the turning characteristics of the vehicle at the initial steering stage and to improve the steering response in the reverse direction at the later steering stage. This embodiment is based upon the recognition that it is preferable to improve the turning characteristics at an initial steering stage, depending upon the kind of vehicle rather than the steering stability of the vehicle and that since it is often required to steer in one direction and then steer in a reverse direction, such as after a lane change operation, it is preferable to improve the steering response in the reverse direction at a later steering stage than the steering stability. For this purpose, in the control unit 24 is stored a control map, as shown in FIG. 4, for controlling the toe direction of the rear wheels. More specifically, in region A1 where the non-dimensional lateral acceleration G is very small, less than 0.2, no toe movement is produced, since toe control for the rear wheels is unnecessary even if the front wheels are being steered. In region A2 where the non-dimensional lateral acceleration G is medium, not less than 0.2 and not more than 0.5, only the inner rear wheel is shifted in a toe-in direction, since this region corresponds to an initial steering stage. Further, in the region A3 where the non-dimensional lateral acceleration G is large, more than 0.5 and is large, both of the rear wheels are shifted in a toe-in direction, since this region corresponds to a later steering stage.

Referring to FIG. 10, first, the control unit 24 reads in a signal sensed by the vehicle speed sensor 25 and a signal sensed by the steering angle sensor 26 (Step SD1) and then it is determined by the control unit 24 whether or not the steering member is being operated based upon the steering angle signal (Step SD2).

If NO, the non-dimensional lateral acceleration is G=0 which means that the vehicle is being operated in a straight line and that the driving operation of the vehicle falls within the region A1 of the map shown in FIG. 4, and the control unit 24 outputs no ON signal to the respective actuating portions 17a, 18, 19a, 21a and 22a of the orifice 17 and valves 18, 19, 21 and 22. As a result, the orifice is fully opened, the valves 18 and 19 are closed and the valves 21 and 22 are fully opened. Consequently, no oil pressure is fed to the respective hydraulic pressure chambers 7 of the hydraulic cylinder devices 4L and 4R and the respective piston 6 is positioned at the end toward the hydraulic pressure chambers 7, thereby to produce no toe movement in the respective rear wheels 1L and 1R as shown in FIG. 11(a).

On the other hand, if YES, the front wheels are being steered and it is further determined by the control unit 24 whether or not the non-dimensional lateral acceleration G is less than 0.2, that is, whether the driving operation of the vehicle falls within the region A1 of the map shown in FIG. 4 (Step SD3).

Figure 11:
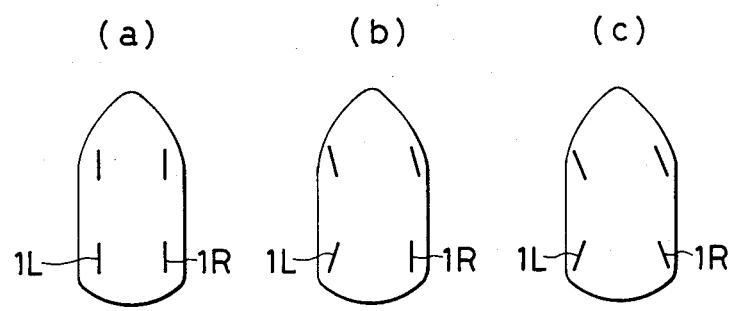
FIG. 11 is a schematic drawing showing the toe control of the rear wheels in a further embodiment of the present invention.

If YES, the non-dimensional lateral acceleration G is less than 0.2 and the driving operation of the vehicle falls within the region A1 of the map shown in FIG. 4, so no toe movement is produced in the rear wheels similarly to the case where the non-dimensional lateral acceleration is G=0 as shown in FIG. 11(a).

On the other hand, if NO, it is further determined by the control unit 24 whether or not the non-dimensional lateral acceleration G is more than 0.5, that is, whether the driving operation of the vehicle falls within the region A3 (Step SD4).

If NO, the non-dimensional lateral acceleration G is not less than 0.2 and not more than 0.5 and the driving operation of the vehicle falls within the region A2. And it is further determined by the control unit 24 whether or not the vehicle is being steered to the left (Step SD5). As a result, if the vehicle is being steered to the left, the control unit 24 produces an ON signal and outputs it to the orifice 17 and the valves 18 and 21, and the opening of the orifice 17 is controlled so as to feed a predetermined oil pressure to the hydraulic pressure chamber 7 of the hydraulic cylinder device 4L and the valve 18 is opened and the valve 21 is closed. Consequently, since oil pressure is fed to the hydraulic pressure chamber 7 of the hydraulic cylinder device 4L, the piston 6 is urged toward the spring chamber 8, thereby to shift only the left rear wheel 1L, which is an inner rear wheel, in a toe-in direction as shown in FIG. 11(b). On the contrary, if the vehicle is being steered to the right, the control unit 24 outputs an ON signal to the orifice 17 and the valves 19 and 22, and the opening of the orifice 17 is controlled so as to feed a predetermined oil pressure to the hydraulic pressure chamber 7 of the hydraulic cylinder device 4R and the valve 19 is opened and the valve 22 is closed. Consequently, since oil pressure is fed to the hydraulic pressure chamber 7 of the hydraulic cylinder device 4R, the piston 6 is urged toward the spring chamber 8, thereby to shift only the right rear wheel 1R, which is an inner rear wheel, in a toe-in direction. Thus, since only the inner rear wheel with respect to the turning direction of the vehicle is shifted in a toe-in direction, the turning characteristics can be improved at an initial steering stage.

If YES, the non-dimensional lateral acceleration G is more than 0.5 and the driving operation of the vehicle falls within the region A3. Then, the control unit 24 produces an ON signal and outputs it to the orifice 17 and the valves 18, 19, 21 and 22, and the opening of the orifice 17 is controlled so as to feed a predetermined oil pressure to the hydraulic pressure chambers 7 of the hydraulic cylinder devices 4L and 4R, and the valves 18 and 19 are opened and the valves 21 and 22 are closed. Consequently, since oil pressure is fed to the hydraulic pressure chambers 7 of the respective hydraulic cylinder devices 4L and 4R, the piston 6 in each hydraulic pressure chamber 7 is urged toward the spring chamber 8, thereby to shift the respective rear wheels 1L and 1R in a toe-in direction. In case where the vehicle is being steered to the left as shown in FIG. 11(c), since the force from the road that acts on the right rear wheel 1R, which is an outer rear wheel, is higher than the force acting on the left rear wheel 1L, which is an inner rear wheel, it is possible to improve the steering stability against the side force acting on the vehicle by shifting the right rear wheel in a toe-in direction even though the left rear wheel is being shifted in a toe-in direction. Further, when the front wheels are steered to the right immediately after being steered to the left, for example for a lane change operation, since the respective rear wheels 1L, 1R have been already shifted in a toe-in direction, in case where the side force acting on the vehicle is small, the turning characteristics can be improved by shifting only the right rear wheel 1R from a toe-in position to a neutral position and maintaining the toe direction of the left rear wheel in a toe-in direction. And in case where the side force acting on the vehicle is large, since the left rear wheel 1L has been already shifted in a toe-in direction, the steering stability against the side force can be improved without any toe change operation of the rear wheels. Thus, when steering further in the reverse direction, it is possible to improve the turning characteristics or the steering stability with high steering response.

According to the above described embodiment, since only an inner rear wheel is shifted in a toe-in direction at an initial steering stage and both rear wheels are shifted in a toe-in direction at a later steering stage, it is possible to improve the turning characteristics at the initial steering stage and the steering response in the reverse direction at the later steering stage.

Further, since in all of the above described embodiments, the toe direction of the rear wheels is shifted only between a toe-in position and a neutral position, it is possible to improve the turning characteristics or the steering stability at an initial steering stage without degrading the steering response.

As described above with respect to the preferred embodiments, according to the present invention, it is possible to obtain a rear wheels steering apparatus for vehicles capable of meeting requirements for different steering characteristics required at each steering stage of front wheels for various kinds of vehicles.

The present invention has thus been shown and described with reference to specific embodiments. However, it should be noted that the present invention is in no way limited to the details of the described arrangements but that changes and modifications may be made without departing from the scope of the appended claims.

For example, although the hydraulic cylinder devices 4L, 4R and the oil circuit are employed as the toe control device in the above described embodiments, other toe control device capable of independently shifting the respective rear wheels in a toe-in direction such as an electrical motor may be employed for the present invention.

Figure 12:
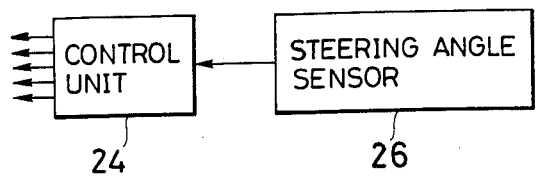
FIG. 12 is a schematic drawing showing a modification of the part of the rear wheels steering apparatus shown in FIG. 1.
Figure 13:
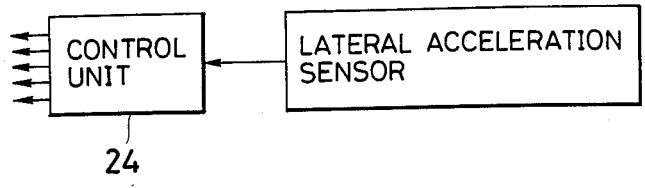
FIG. 13 is a schematic drawing showing another modification of the part of the rear wheels steering apparatus shown in FIG. 1.

Further, although in the above described embodiments, the lateral acceleration is detected on the basis of the vehicle speed sensed by the vehicle speed sensor 25 and the steering angle sensed by the steering angle sensor 26, the lateral acceleration may be detected on the basis of only the steering angle sensed by the steering angle sensor 26, as shown in FIG. 12. Moreover, it is possible to directly detect lateral acceleration by employing a lateral acceleration sensor as shown in FIG. 13.

Figure 14:
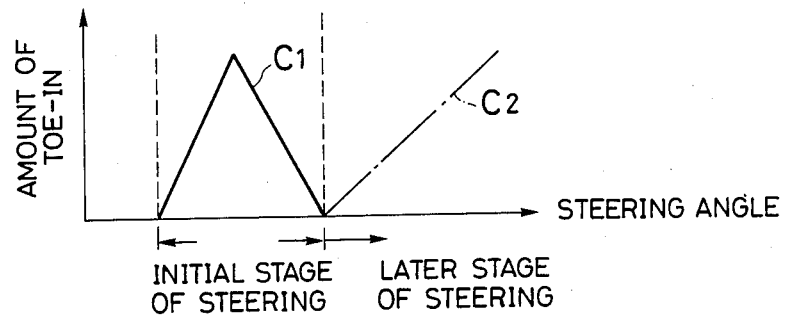
FIGS. 14 and 15 are graphs showing how rear wheels are shifted in a toe-in direction respectively.
Figure 15:
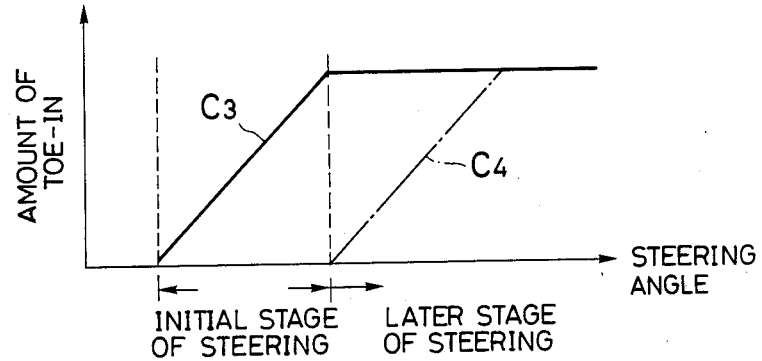

Furthermore, although in the above described embodiments, ON-OFF control is used to change the amount of shift of the rear wheel or wheels in a toe-in direction, the control may be so as to effect linear change in accordance with an increase in the steering angle, as shown in FIGS. 14 and 15. In FIG. 14, the amount of shift of one rear wheel in a toe-in direction is controlled in accordance with a curve C1 at an initial steering stage and the amount of shift of the other rear wheel or of the respective wheels in a toe-in direction is controlled in accordance with a curve C2 at a later stage. In FIG. 15, the amount of shift of one rear wheel in a toe-in direction is controlled in accordance with a curve C3 throughout the steering and the amount of shift of the other rear wheel in a toe-in direction is controlled in accordance with a curve C4 at a later steering stage. The control method shown in FIG. 14 can be applied to all of the above described embodiments, while the control method shown in FIG. 15 can be applied to only the embodiments shown in FIGS. 8 and 10. It should be noted that in case where the lateral acceleration is directly detected by a lateral acceleration sensor as shown in FIG. 13, the abscissa axis in FIGS. 13 and 14 is selected by the lateral acceleration and the amount of shifting of the rear wheels is changed in accordance with an increase in the lateral acceleration.

We claim:

1. A rear wheels steering apparatus for a vehicle comprising left rear wheel steering means capable of shifting a left rear wheel in a toe-in direction, right rear wheel steering means capable of shifting a right rear wheel in a toe-in direction, steering operation detecting means for detecting a steering stage of the front wheels of said vehicle and toe control means for actuating one of said left and right rear wheel steering means to shift only one of said left and right rear wheels in a toe-in direction at an initial steering stage of said front wheels in accordance with a detected signal of said steering operation detecting means and actuating at least the other of said left and right rear wheel steering means to shift the other of said left and right rear wheels in a toe-in direction at a later steering stage of said front wheels in accordance with a detected signal of said steering operation detecting means.

2. A rear wheels steering apparatus in accordance with claim 1 in which said toe control means actuates one of said left and right rear wheel steering means which steers an inner rear wheel with respect to the turning direction of said vehicle to shift said inner rear wheel in a toe-in direction at said initial steering stage of said front wheels.

3. A rear wheels steering apparatus in accordance with claim 2 in which said toe control means actuates the other of said left and right rear wheel steering means to shift an outer rear wheel with respect to the turning direction of said vehicle in a toe-in direction at said later steering stage of said front wheels.

4. A rear wheels steering apparatus in accordance with claim 3 in which said toe control means further actuates said one of said left and right rear wheel steering means which steers said inner rear wheel to shift said inner rear wheel to a neutral toe position at said later steering stage of said front wheels.

5. A rear wheels steering apparatus in accordance with claim 3 in which said toe control means further actuates said one of said left and right rear wheel steering means which steers said inner rear wheel to shift said inner rear wheel in a toe-in direction at said later steering stage of said front wheels.

6. A rear wheels steering apparatus in accordance with claim 1 in which said toe control means actuates one of said left and right rear wheel steering means which steers an outer rear wheel with respect to the turning direction of said vehicle to shift said outer rear wheel in a toe-in direction at said initial steering stage of said front wheels.

7. A rear wheels steering apparatus in accordance with claim 6 in which said toe control means actuates the other of said left and right rear wheel steering means to shift an inner rear wheel with respect to the turning direction of said vehicle in a toe-in direction at said later steering stage of said front wheels.

8. A rear wheels steering apparatus in accordance with claim 7 in which said toe control means further actuates said one of said left and right rear wheel steering means which steers said outer rear wheel to shift said outer rear wheel to a neutral toe position at said later steering stage of said front wheels.

9. A rear wheels steering apparatus in accordance with claim 7 in which said toe control means further actuates said one of said left and right rear wheel steering means which steers said outer rear wheel to shift said outer rear wheel in a toe-in direction at said later steering stage of said front wheels.

10. A rear wheels steering apparatus in accordance with claim 3 in which said steering operation detecting means is a steering angle sensor.

11. A rear wheels steering apparatus in accordance with claim 10 in which said toe control is carried out by said toe control means at said initial steering stage of said front wheels when a steering angle detected by said steering operation detecting means is more than a first predetermined angle and is less than a second predetermined angle and the toe control is carried out by said toe control means at said later steering stage of said front wheels when the steering angle detected by said steering operation detecting means is not less than the second predetermined angle.

12. A rear wheels steering apparatus in accordance with claim 11 in which said toe control is carried out by said toe control means in such a manner that a toe direction of the rear wheels is changed linearly in accordance with an increase in the steering angle.

13. A rear wheels steering apparatus in accordance with claim 3 in which said steering operation detecting means is a lateral acceleration sensor.

14. A rear wheels steering apparatus in accordance with claim 13 in which the toe control is carried out by said toe control means at said initial steering stage of said front wheels when a steering angle detected by said steering operation detecting means is more than a first predetermined angle and is less than a second predetermined angle and in which the toe control is carried out by said toe control means at said later steering stage of said front wheels when a steering angle detected by said steering operation detecting means is not less than the second predetermined angle.

15. A rear wheels steering apparatus in accordance with claim 14 in which said toe control is carried out by said toe control means in such a manner that the toe direction of the rear wheels is changed linearly in accordance with passage of time.

16. A rear wheels steering apparatus in accordance with claim 7 in which said steering operation detecting means is a steering angle sensor.

17. A rear wheels steering apparatus in accordance with claim 16 in which the toe control is carried out by said toe control means at said initial steering stage of said front wheels when a steering angle detected by said steering operation detecting means is more than a first predetermined angle and is less than a second predetermined angle and in which the toe control is carried out by said toe control means at said later steering stage of said front wheels when a steering angle detected by said steering operation detecting means is not less than the second predetermined angle.

18. A rear wheels steering apparatus in accordance with claim 17 in which said toe control is carried out by said toe control means in such a manner that the toe direction of the rear wheels is changed linearly in accordance with an increase in the lateral acceleration.

19. A rear wheels steering apparatus in accordance with claim 7 in which said steering operation detecting means is a lateral acceleration sensor.

20. A rear wheels steering apparatus in accordance with claim 19 in which the toe control is carried out by said toe control means at said initial steering stage of said front wheels when a steering angle detected by said steering operation detecting means is more than a first predetermined angle and is less than a second predetermined angle and in which the toe control is carried out by said toe control means at said later steering stage of said front wheels when a steering angle detected by said steering operation detecting means is not less than the second predetermined angle.

21. A rear wheels steering apparatus in accordance with claim 20 in which said toe control is carried out by said toe control means in such a manner that the toe direction of the rear wheels is changed linearly in accordance with the passage of time.

* * * * *